(12) United States Patent
Zindler

(10) Patent No.: US 10,532,776 B2
(45) Date of Patent: Jan. 14, 2020

(54) SUSPENSION ASSEMBLY FOR A REAR ENTRY VEHICLE

(71) Applicant: The Braun Corporation, Winamac, IN (US)

(72) Inventor: Michael T. Zindler, Kalamazoo, MI (US)

(73) Assignee: THE BRAUN CORPORATION, Winamac, IN (US)

( * ) Notice: Subject to any disclaimer, the term of this patent is extended or adjusted under 35 U.S.C. 154(b) by 114 days.

(21) Appl. No.: 15/792,892

(22) Filed: Oct. 25, 2017

(65) Prior Publication Data

US 2018/0127034 A1    May 10, 2018

Related U.S. Application Data

(60) Provisional application No. 62/418,330, filed on Nov. 7, 2016.

(51) Int. Cl.
| | | |
|---|---|---|
| *B62D 25/20* | (2006.01) | |
| *B60G 3/26* | (2006.01) | |
| *B60G 7/02* | (2006.01) | |
| *B60P 7/08* | (2006.01) | |
| *B60G 11/16* | (2006.01) | |

(52) U.S. Cl.
CPC ........... *B62D 25/2027* (2013.01); *B60G 3/26* (2013.01); *B60G 7/02* (2013.01); *B60P 7/0807* (2013.01); *B60P 7/0823* (2013.01); *B60G 11/16* (2013.01); *B60G 2202/135* (2013.01); *B60G 2204/124* (2013.01); *B60G 2204/129* (2013.01); *B60G 2204/1434* (2013.01)

(58) Field of Classification Search
CPC ....... B62D 25/2027; B62D 21/11; B60G 3/20
USPC .................................................. 280/124.109
See application file for complete search history.

(56) References Cited

U.S. PATENT DOCUMENTS

| | | | |
|---|---|---|---|
| 3,275,370 A | 9/1966 | Smith | |
| 4,114,318 A | 9/1978 | Brindle | |
| 4,664,584 A | 5/1987 | Braun et al. | |
| 5,180,275 A | 1/1993 | Czech et al. | |
| 6,511,096 B1 * | 1/2003 | Kunert | B60G 7/02 |
| | | | 280/124.109 |
| 6,793,269 B2 | 9/2004 | Pugh et al. | |
| 6,860,543 B2 | 3/2005 | George et al. | |
| 7,364,219 B2 | 4/2008 | Lowson et al. | |

(Continued)

*Primary Examiner* — Faye M Fleming
(74) *Attorney, Agent, or Firm* — Taft Stettinius & Hollister LLP; Stephen F. Rost

(57) ABSTRACT

A suspension assembly for a vehicle modified to transport an individual using a wheelchair. The modified vehicle includes a lowered floor having an inclined portion to accommodate a ramp. The suspension replaces a portion of the suspension of an original equipment manufactured vehicle to accommodate the lowered floor, which is lowered from the original floor and which includes a width not found in the original floor. The suspension assembly includes a left bushing arm and a right bushing arm operatively connected together by a front and a rear crossmembers. Vehicle frame mounts, coil spring locations, and shock absorber locations are maintained, while accommodating the depth and width of the lowered floor. The additional weight of the vehicle, due to the addition of the lowered floor and anticipated weight of wheelchaired individuals, is accommodated by the suspension to maintain rider comfort.

18 Claims, 8 Drawing Sheets

(56) References Cited

U.S. PATENT DOCUMENTS

| | | | |
|---|---|---|---|
| 7,816,878 B2 | 10/2010 | Heigl et al. | |
| 7,934,290 B2 | 5/2011 | Gherardi et al. | |
| 8,579,310 B2* | 11/2013 | Tanaka | B60G 3/20 |
| | | | 280/124.109 |
| 8,616,567 B2* | 12/2013 | Eguchi | B60G 3/20 |
| | | | 267/189 |
| 8,641,066 B2* | 2/2014 | Kudla | B62D 21/11 |
| | | | 180/312 |
| 8,807,575 B2 | 8/2014 | Bartel et al. | |
| 9,476,246 B2 | 10/2016 | Fairchild | |
| 9,840,280 B2* | 12/2017 | Wolf-Monheim | B62D 21/11 |
| 2006/0287375 A1 | 11/2006 | Enomoto | |
| 2007/0062118 A1 | 3/2007 | Lindemann et al. | |
| 2009/0072583 A1 | 3/2009 | Elliott et al. | |
| 2010/0289299 A1 | 11/2010 | Kitayama | |
| 2010/0295337 A1 | 11/2010 | Elliott et al. | |
| 2014/0248109 A1 | 9/2014 | Johnson et al. | |
| 2014/0327219 A1* | 11/2014 | Perri | B60G 11/08 |
| | | | 280/124.109 |
| 2014/0339856 A1* | 11/2014 | Obata | B62D 21/11 |
| | | | 296/193.08 |
| 2014/0356118 A1 | 12/2014 | Friedlinghaus et al. | |
| 2015/0273963 A1* | 10/2015 | Zandbergen | B60G 3/20 |
| | | | 280/124.109 |
| 2018/0086578 A1* | 3/2018 | Pugh | B62D 25/025 |
| 2018/0361481 A1* | 12/2018 | Tenhaeff | B22F 7/08 |

* cited by examiner

SUSPENSION ASSEMBLY FOR A REAR ENTRY VEHICLE

CROSS-REFERENCE TO RELATED APPLICATION

This application claims the benefit of U.S. Provisional Patent Application Ser. No. 62/418,330, having the title "Suspension Assembly for a Rear Entry Vehicle" filed Nov. 7, 2016, the contents of which are hereby incorporated by reference in their entirety.

FIELD

The present disclosure relates to a motorized vehicle adapted to provide entry to and exit from the vehicle for an individual using a wheelchair, and more particularly to a suspension subassembly to modify an original equipment manufacturer (OEM) vehicle for use by the individual.

BACKGROUND

Automobile manufacturers do not currently mass-produce passenger motor vehicles specifically designed to transport passengers having physical limitations. Consequently, mass-produced passenger vehicles are modified, or retrofitted, by a number of aftermarket companies dedicated to supplying vehicles to physically limited passengers. Such vehicles can be modified by removing certain parts or structures of a vehicle and replacing those parts with parts specifically designed to accommodate the physically limited passenger.

Some modified vehicles include full-sized vans having an electrical or hydraulic powered wheelchair lift installed on the vehicle to assist wheelchair occupants into and out of the van. These lifts consist of a horizontal platform that translates vertically to allow the wheelchair or scooter occupant easy access from ground level to the interior of the vehicle for transport. Other vehicles include a ramp that can be electrically, hydraulically, or manually operated. For example, in one configuration, a van is retrofitted with a ramp to enable a physically limited individual using a wheelchair to enter and exit the vehicle without the assistance of another individual. Wheelchairs can include both manually powered and electrically powered wheelchairs.

Different types of ramps enable the wheelchair occupant move from the ground external to the vehicle to the floor within the vehicle. The ramp is typically stored in the rear or side door entrance of the vehicle. To access the ramp, the ramp may be rotated outwardly from the vehicle about a pivot. In another embodiment, the ramp is moved along a floor of the van, until one end of the ramp contacts the ground while the other end is supported by the vehicle.

In those vehicles having a ramp which extends from the rear entrance of a vehicle, the floor of the vehicle is modified by removing the OEM floor and replacing with a different floor to accommodate the ramp as well as the wheelchair occupant. The floor is typically lower when compared to the OEM floor. This requires a significant modification to the floor of the vehicle as manufactured by the OEM. Lowering of the floor, however, can interfere with the original suspension system provided when the vehicle is purchased. Consequently, what is needed is a suspension subassembly which provides the same or similar features as the original equipment vehicle, and which accommodates the lowered floor and ramp, while maintaining or improving the rideability and passenger comfort of the vehicle.

SUMMARY

In one embodiment of the present disclosure, there is provided a suspension subassembly for a rear entry vehicle.

In another embodiment, there is provided a suspension assembly for a vehicle defining a central longitudinal axis and a horizontal plane. The suspension assembly includes left and right bushing arms and front and rear crossmembers rigidly connected to the left and right bushing arms. Each of the left and right bushing arms includes an angled portion inclined with respect to the horizontal plane and inclined with respect to the longitudinal axis.

In still another embodiment, there is provided a modified original equipment manufacturer vehicle defining a central longitudinal axis and a horizontal plane. The vehicle includes an original equipment manufacturer vehicle frame, wherein the vehicle frame includes at least two bushing locations. A floor includes a first portion generally aligned with the horizontal plane and an inclined portion inclined with respect to the horizontal plane. A suspension assembly subtends the floor and includes a first angled portion and a second angled portion each inclined with respect to the horizontal plane and inclined with respect to the longitudinal axis, wherein each of the angled portions include a bushing operatively connected to the at least two bushing locations.

In a further embodiment, there is provided a suspension assembly defining a central longitudinal axis and a horizontal plane for a passenger vehicle. The suspension assembly includes left and right bushing arms configured to extend generally along the central longitudinal axis and along the horizontal plane and front and rear crossmembers rigidly connected to the left and right bushing arms. Each of the left and right bushing arms includes an angled portion configured to be inclined with respect to the horizontal plane and configured to be inclined with respect to the central longitudinal axis.

In an additional embodiment, there is provided a modified original equipment manufactured vehicle defining a central longitudinal axis and a horizontal plane including an original equipment manufactured vehicle frame, wherein the vehicle frame includes at least two bushing locations. The vehicle further includes a floor having a first portion generally aligned with the horizontal plane and an inclined portion inclined with respect to the horizontal plane. A suspension assembly subtends the floor and includes a first angled portion inclined with respect to the horizontal plane and with respect to the longitudinal axis and a second angled portion inclined with respect to the horizontal plane and with respect to the longitudinal axis. Each of the angled portions includes a bushing operatively connected to the at least two bushing locations.

In still another embodiment, there is provided a method of modifying an original equipment manufactured vehicle defining a central longitudinal axis and a horizontal plane having a floor, a suspension assembly, and at least two bushing locations. The method includes: removing the floor of the vehicle; removing the suspension assembly of the vehicle; and installing a replacement suspension assembly in the vehicle to the at least two bushing locations, wherein the replacement suspension assembly includes a first angled portion inclined with respect to the horizontal plane and with respect to the longitudinal axis and a second angled portion inclined with respect to the horizontal plane and with respect to the longitudinal axis, wherein each of the angled portions includes a bushing operatively connected to the at least two bushing locations.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
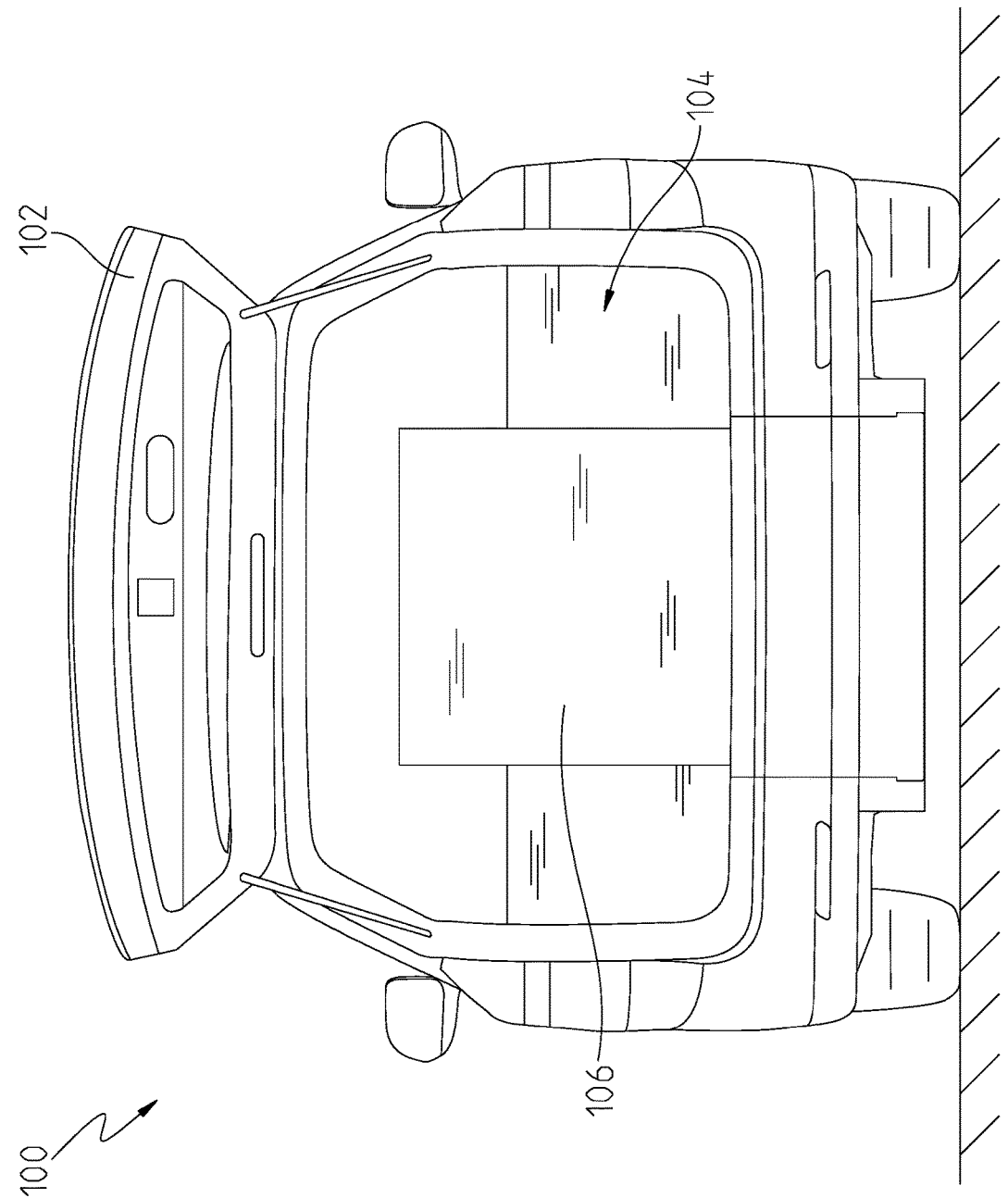
FIG. 1 illustrates a rear view of a vehicle capable of transporting a mobility-challenged individual.

Referring now to FIG. 1, a vehicle 100 adapted for transporting a mobility-challenged individual is shown. The vehicle can be a van, taxi, bus, or any other type of vehicle capable of transporting a mobility-challenged individual. In FIG. 1, a rear end of the vehicle 100 is shown having a powered lift-gate 102 capable of being electrically, hydraulically, mechanically, or manually raised or lowered. When raised, the lift-gate exposes an access opening 104 to the rear of the vehicle 100. A ramp 106 is shown in a stowed position, i.e., a vertical orientation with respect to a floor of the vehicle 100. The ramp can be used to assist with transporting the mobility-challenged individual from a ground surface to a location inside of the vehicle.

Figure 2:
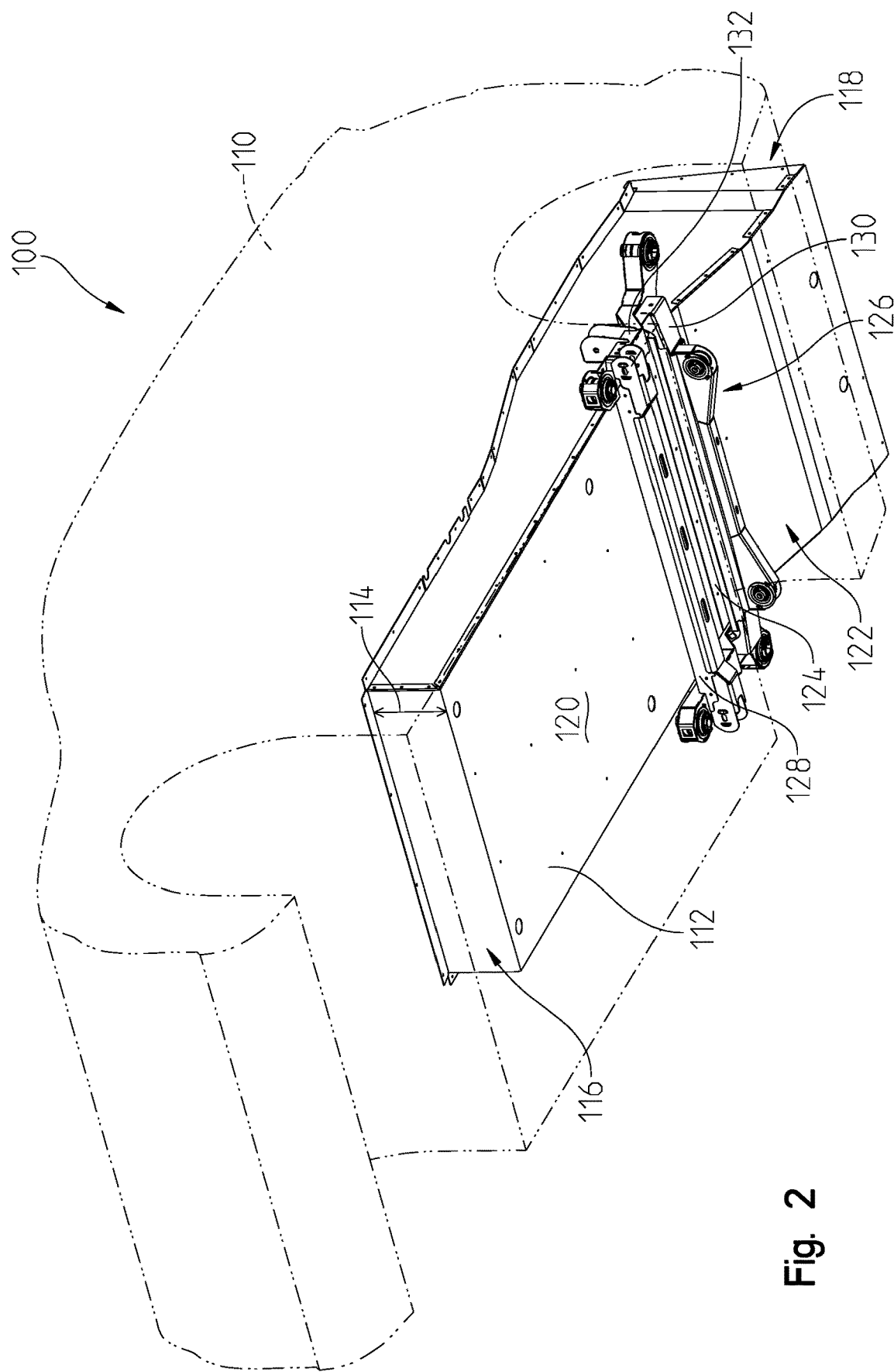
FIG. 2 illustrates an underneath perspective view of a modified vehicle including a lowered floor and a suspension subassembly.

As illustrated in FIG. 2, the vehicle 100 includes a frame 110, illustrated in outline, having a unibody frame construction. The present disclosure, however, is not limited to vehicles having a unibody construction, but includes other vehicles having a frame on body construction. Consequently, the use of vehicle herein includes all types and kinds of vehicles with a body on frame construction, a unibody construction, or other constructions. In addition, while the vehicle 100 is illustrated as a passenger van, the present disclosure is directed to all passenger vehicles carrying one or more passengers.

A floor 112 is coupled to the frame 110, as is understood by those skilled in the art. The floor 112 replaces an original floor provided by the OEM, which is removed from the vehicle to provide additional interior headroom. In one embodiment, the floor 112 includes a depth 114 of approximately seven inches. The floor 112 also includes a length which extends from a first end 116 to a second end 118. The floor 112 includes a generally planar portion 120 which is disposed adjacently to a ramped portion 122, which is inclined with respect to the portion 120. A transition portion 124 defines a transition location between the planar portion 120 and the ramped portion 122.

Located beneath the floor 112 is a suspension subassembly 126 which subtends the floor 112, but which does not contact the floor 112 in the illustrated embodiment. The illustrated embodiment of FIG. 2 includes an air gap between the floor 112 and suspension subassembly 126. In other embodiments, the suspension subassembly 126 is in contacting relationship with the floor 112. The subassembly 126 includes a front crossmember 128 located beneath the planar portion 120 and a rear crossmember 130 also located beneath the planar portion 120. In other embodiments, the rear crossmember 130 is located beneath the transition portion 124 or beneath the ramped portion 126. A left bushing arm 132, or left side member, is operatively connected to the front crossmember 128 and to the rear crossmember 130.

The suspension subassembly 126 is configured to accommodate the lowered floor as well as the ramped portion. In making the accommodation, a conventional suspension assembly is replaced with the suspension subassembly 126, since the conventional suspension assembly is not configured to allow the replacement of the OEM floor with the floor 112 of FIG. 2. The subassembly 126 of FIG. 2 replaces an OEM subassembly 200 of FIG. 3 which includes a subassembly 202 operatively connected to a left trailing arm 204 and a right trailing arm 206. The subassembly 200 is oriented with respect to a front 205 of the vehicle 100. Each of the left and right trailing arms 204 and 206 are respectively and operatively connected to a left knuckle assembly 208 and a right knuckle assembly 210. Each of the knuckle assemblies 208 and 210 includes a coil spring isolator 212 and 214, as is understood by those skilled in the art. A left side shock damper assembly 216 and a right side damper assembly 218 are also provided. Free-wheeling left and right rear wheels and the associated parts (not shown) are supported at left and right knuckles 208 and 210.

The vehicle chassis or frame is the main supporting structure of a motor vehicle to which all other components are mounted. As described previously, vehicles may be formed of a unibody construction in which the frame and body are integrated into one another. The subassembly 202 takes on loads from the rear suspension components and transfers those loads to the unibody. During hard cornering, for example, the forces or loads from the control arms may cause the subassembly 202 to deflect, which can cause misalignment resulting in inconsistent handling of the vehicle. Deflection is reduced by adding support braces, also called crossmembers, from one side to the other of the subassembly 202 as illustrated.

The subassembly 202 includes a first cross member 220, a second cross member 222, and a third cross member 224. The first cross member 220 is disposed towards a front of the subassembly 202 and the third cross member 224 is disposed towards the back of the subassembly 202. The second cross member 222 is disposed between the two crossmembers 220 and 224. Each cross member is coupled to a left bushing arm 226 and a right bushing arm 228. The cross members 220, 222, and 224 are substantially aligned in a direction transverse to a centrally located longitudinal axis that passes through the front and rear ends of the vehicle. As shown, the second cross member 222 is positioned at a location that is higher than the first and third cross members 220 and 224 when compared to level ground.

The subassembly 202 includes a plurality of mounting locations for mounting to mounting locations of the frame (not shown) of the vehicle. A first mounting location 230 is disposed to the front 205 and on the right bushing arm 228. A second mounting location 232 is disposed to the front 205 and at the left bushing arm 226. A third mounting location 234 is disposed to the rear of right bushing arm 228, and a fourth mounting location 236 is disposed to the rear and left bushing arm 226. A bushing, in different embodiments, is located in each mountings location. The height of the mounting locations 234 and 236, when compared to ground, is generally higher than a height of the first mounting location 230 and the second mounting location 232. This change in height accommodates an interior seating arrangement in which the rearmost seat is slightly higher than a middle seat which is slightly higher than a front seat. This arrangement is known as "stadium seating".

Figure 3:
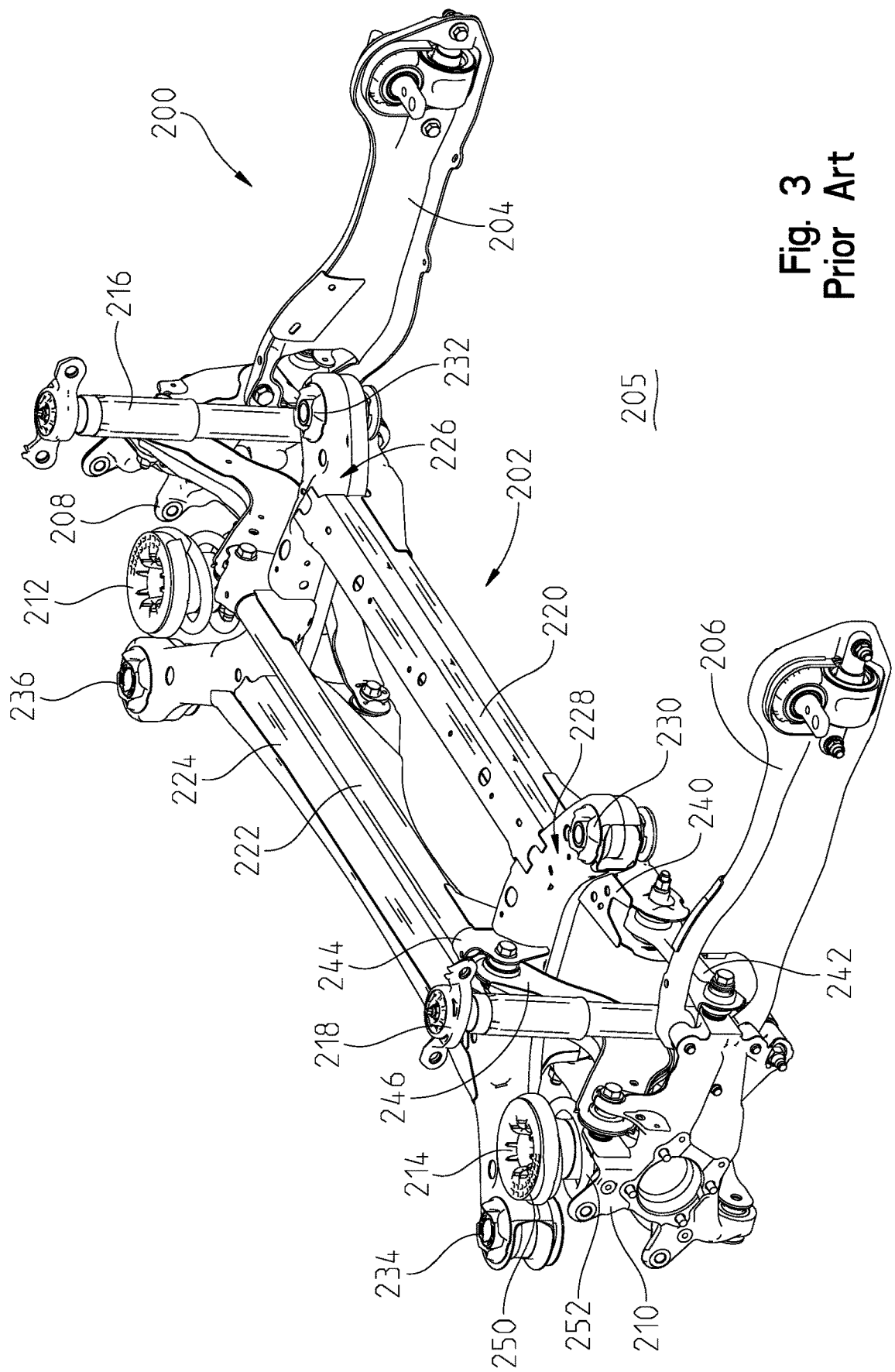
FIG. 3 illustrates a prior art OEM assembly for mounting rear wheels to a vehicle frame.

The subassembly 200 also includes a plurality of joint locations. In FIG. 3, for example, a toe link joint 240 is connected to a toe link 242. Moreover, a camber link joint 244 is connected to a camber link 246. Further, a spring link joint 250 is connected to a spring 252. The toe link joint 240, the camber link joint 244, and the spring link joint 250 are coupled to the rear knuckle 210. Similar parts are coupled to the rear knuckle 208.

Figure 4:
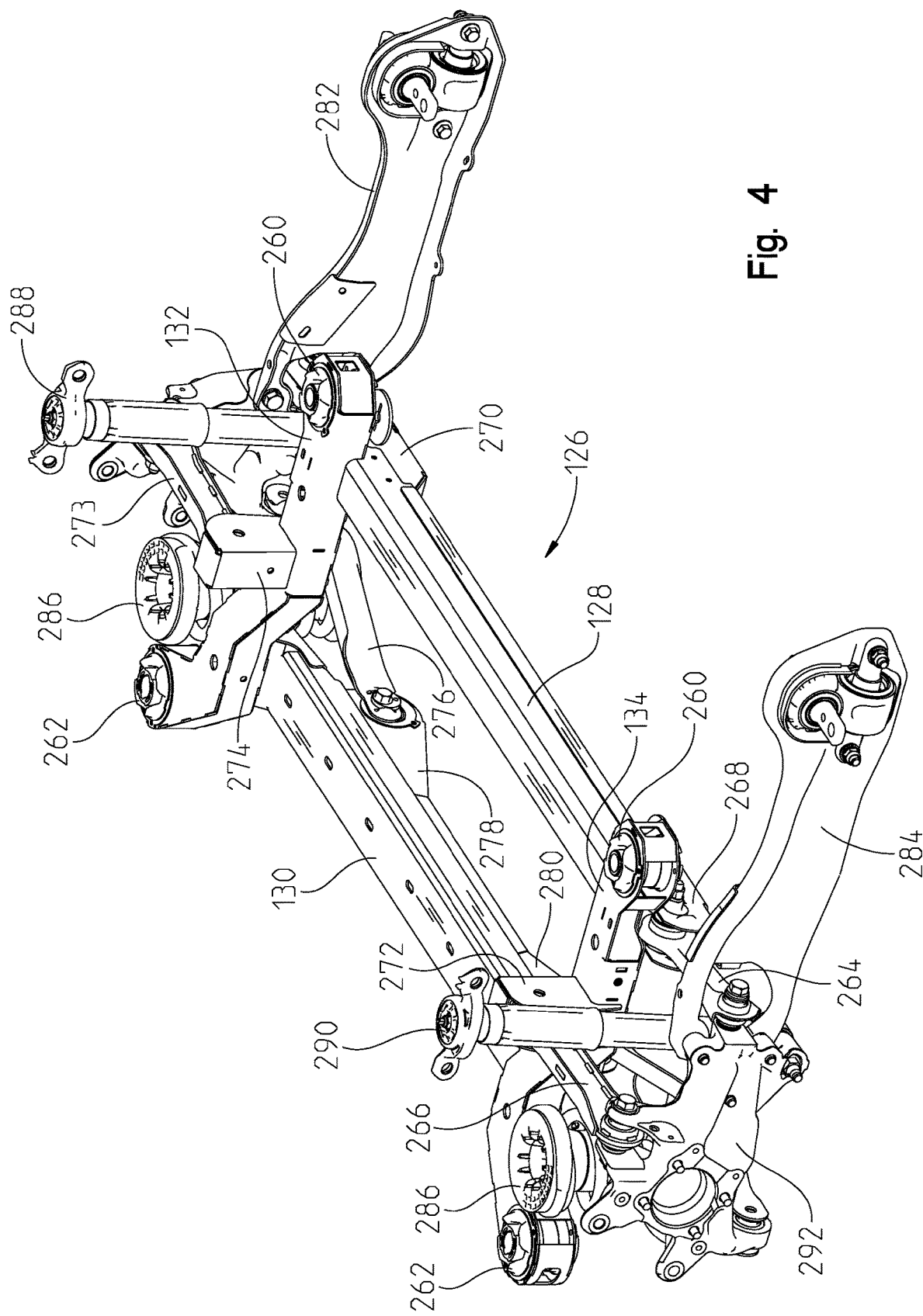
FIG. 4 illustrates a subassembly of the present disclosure configured to mount rear wheel subassemblies to a vehicle and formed to accommodate a lowered vehicle floor having a ramp portion.

FIG. 4 illustrates the subassembly 126 of FIG. 2 which is configured to not only replace the OEM subassembly 202 of FIG. 3, but to provide for the replacement floor 112. The subassembly 126, as previously described, includes the front crossmember 128, the rear crossmember 130, the left bushing arm 132, and a right bushing arm 134 operatively connected to the front and rear crossmembers 128 and 130. The subassembly 126, however, does not include, nor does it require the crossmember 222 of the OEM assembly 202 of FIG. 3. In this way, the assembly 126 accommodates the lowered floor 112 of FIG. 2.

Each of the left bushing arm 132 and the right bushing arm 134 includes a front mount 260 and a rear mount 262. The front mounts 260 and the rear mounts 262 include bushings which are coupled to existing mounting locations on the vehicle frame 110. Mounting of the front mounts 260 and rear mounts 262 fixedly couples the subassembly 126 to the vehicle frame 110. The subassembly 126 is further configured to not only accommodate the depth and length of the floor 118, but also provides support for a rear wheel assembly, a portion of which is not shown.

The rear wheel assembly includes a toe link 264 and a camber link 266, as is understood by those skilled in the art. The toe link 264 is not modified, but is an OEM part, such as shown in FIG. 3. The OEM camber link is replaced by a new camber link 266 to accommodate the change to the camber link pivot point. By moving the camber link pivot point to an outboard location, similar to the front mounting locations 260, the width of the lower floor is accommodated. The toe link 264 is coupled to a toe link mount 268, which in the illustrated configuration, is formed at one end of the crossmember 128. A second toe link mount 270 is formed at another end of the crossmember 128. Each of the mounts 268 and 270 extends past respective portions of the left bushing arm 132 and right bushing arm 134. The camber link 266 is coupled to a camber link mount 272, which is formed as part of the right bushing arm 134 and which extends above a main portion of the arm 134. Another camber link 273 extends from a camber link mount 274 which extends above a main portion of the left bushing arm 132.

The wheel assembly also includes two spring links, one of which, spring link 276, is illustrated. One end of the spring link 276 is coupled to a spring link bracket 278, which is formed toward one end and as part of the rear crossmember 130. A second spring link bracket 280 is formed at the other end and as part of the rear crossmember 130.

The wheel assembly further includes a left trailing arm 282 and a right trailing arm 284 as is understood by those skilled in the art. A left side damper assembly 288 and a right side damper assembly 290 are also provided. Free-wheeling left and right rear wheels and the associated parts are supported at left and right knuckles 292, one of which is shown.

Figure 5:
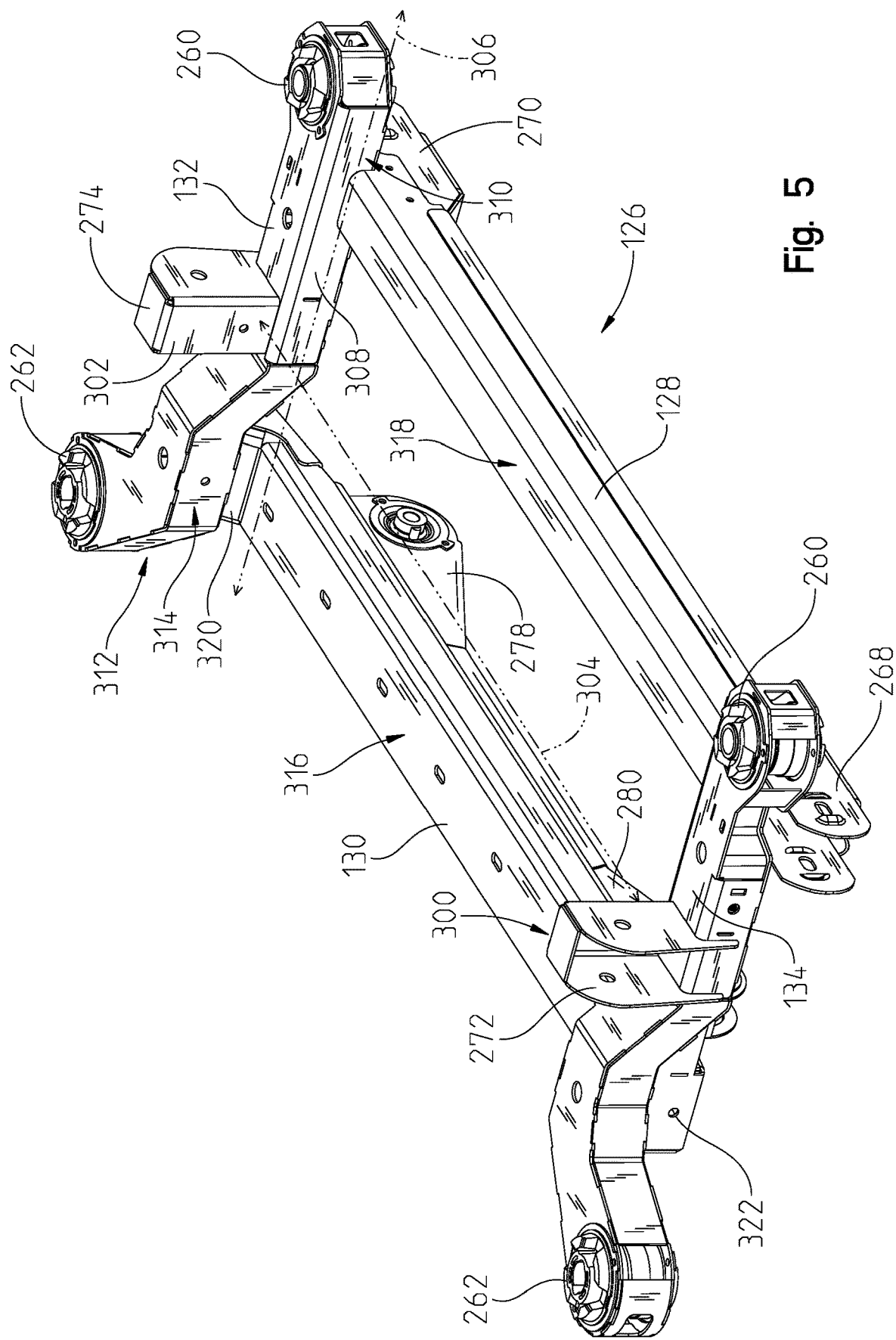
FIG. 5 illustrates a top perspective view of a subassembly of the present disclosure including left and right bushing arms and front and rear crossmembers.

FIG. 5 illustrates a top perspective view of the subassembly 126. Each of the camber link mounts 272 and 274 are supported by and coupled respectively to the right bushing arm 134 and the left bushing arm 132. The camber link mounts extend upwardly from the bushing arm. Camber link mount 272 includes a surface 300 which is separated from a surface 302 of camber link mount 274. A distance 304 separating the surface 300 and 302 is sufficiently wide to accommodate a width of the floor 112 of FIG. 2. In addition to being spaced sufficiently to accommodate the floor 112, the location of the camber link mounts 272 and 274 are appropriately located along a length of the bushing arms, such that the camber links 266 and 273 can be and are coupled to preexisting coupling locations of the wheel assembly.

Each of the left and right bushing arms 132 and 134 extends longitudinally along a line parallel to a longitudinal central axis of the vehicle 100. One longitudinal line 306 is illustrated. Each of the bushing arms 132 and 134 respectively include a first portion 308 having a first surface 310 extending generally parallel to the line 306 and a second portion 312 having a surface 314 which is inclined away from the line 306. The inclined portion 312 terminates at the rear mount 262 which is connected to the frame of the vehicle at a preexisting connecting location. The surface 312, however, is substantially aligned with a vertical plane defined by the line 306. Consequently, the surface 310 and the surface 314 are substantially parallel to sidewalls of the floor 112.

The line 306 is also generally aligned with a generally horizontal plane of the vehicle 100, when properly inflated tires are provided.

The front mount 260 and the rear mount 262 are generally aligned along different horizontal planes. The change in elevation between the front mount 260 and the rear mount 262 enables the subassembly 126 to be connected to the pre-existing frame locations provided on the OEM vehicle, while enabling the addition of the floor 112. Also, as described with respect to FIG. 2, the subassembly subtends the floor 112. Consequently, a top surface 316 of rear crossmember 130 is generally at the same level as a top surface 318 of the front crossmember 128. To maintain the same or similar elevation for the surfaces 316 and 318, the rear crossmember 130 includes a first end 320 and a second end 322, each of which extends downwardly from the attached left and right bushing arms 132 and 134. In this way, the front mounts 260 and rear mounts 262 connect to the pre-existing mounting locations on the frame, while accommodating shape and size of the floor 112. While neither of the crossmembers 128 and 130 contacts the exterior surface of the floor in this illustrated embodiment, the crossmembers provide sufficient structural support for the described links and wheel assemblies.

Figure 6:
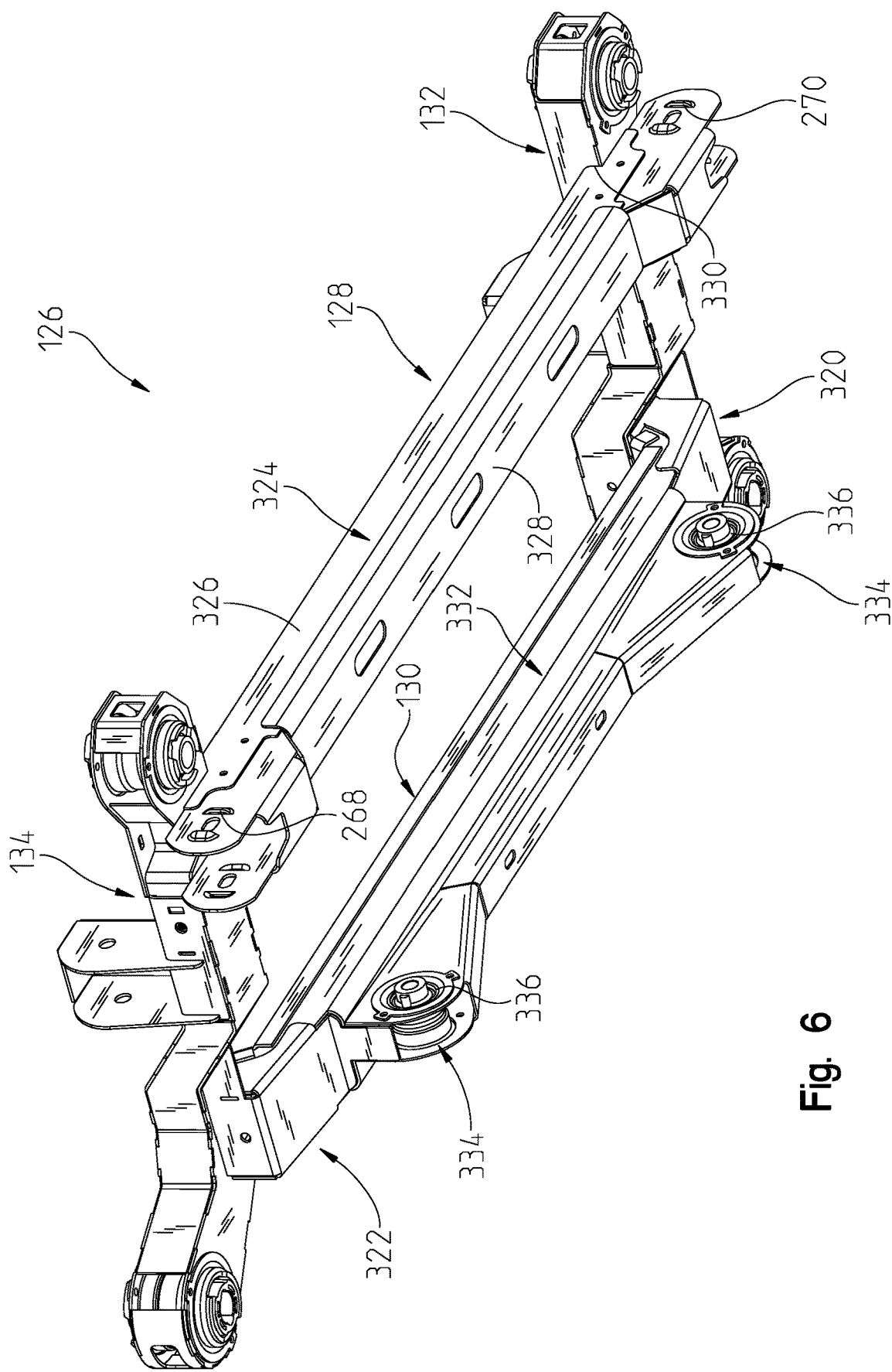
FIG. 6 illustrates a bottom perspective view of the subassembly of FIG. 5.

FIG. 6 illustrates a bottom perspective view of the subassembly 126 including the left bushing arm 132, the right bushing arm 134, the front crossmember 128, and the rear crossmember 130. In this figure, toe link mount 268 and toe link mount 270 extend away from a main portion 324 of the crossmember 128. The main portion 324, in the illustrated embodiment, includes a first part 326 and a second part 328 coupled thereto. The first part 326 includes a notch 330 at either end of the main first part 326 to locate the left and right side bushing arms 132 and 134. While the crossmember 128 is illustrated as having multiple component parts coupled together, which are made of extruded or bent materials, such as aluminum or steel. In other embodiments, the crossmember 128 is made of fewer or more components, which are formed of extruded or bent materials, such as steel or aluminum.

The rear crossmember 130, which includes the first end 320 and the second end 322, includes the spring link bracket 278 and the spring link bracket 280 which extend downwardly from a main portion 332 of the rear crossmember 130. The spring link brackets are formed to include apertures 334 configured to receive bushings 336 which receive spring links 276. The main portion 332 is made of one or more component parts of extruded or bent materials, such as steel or aluminum.

Figure 7:
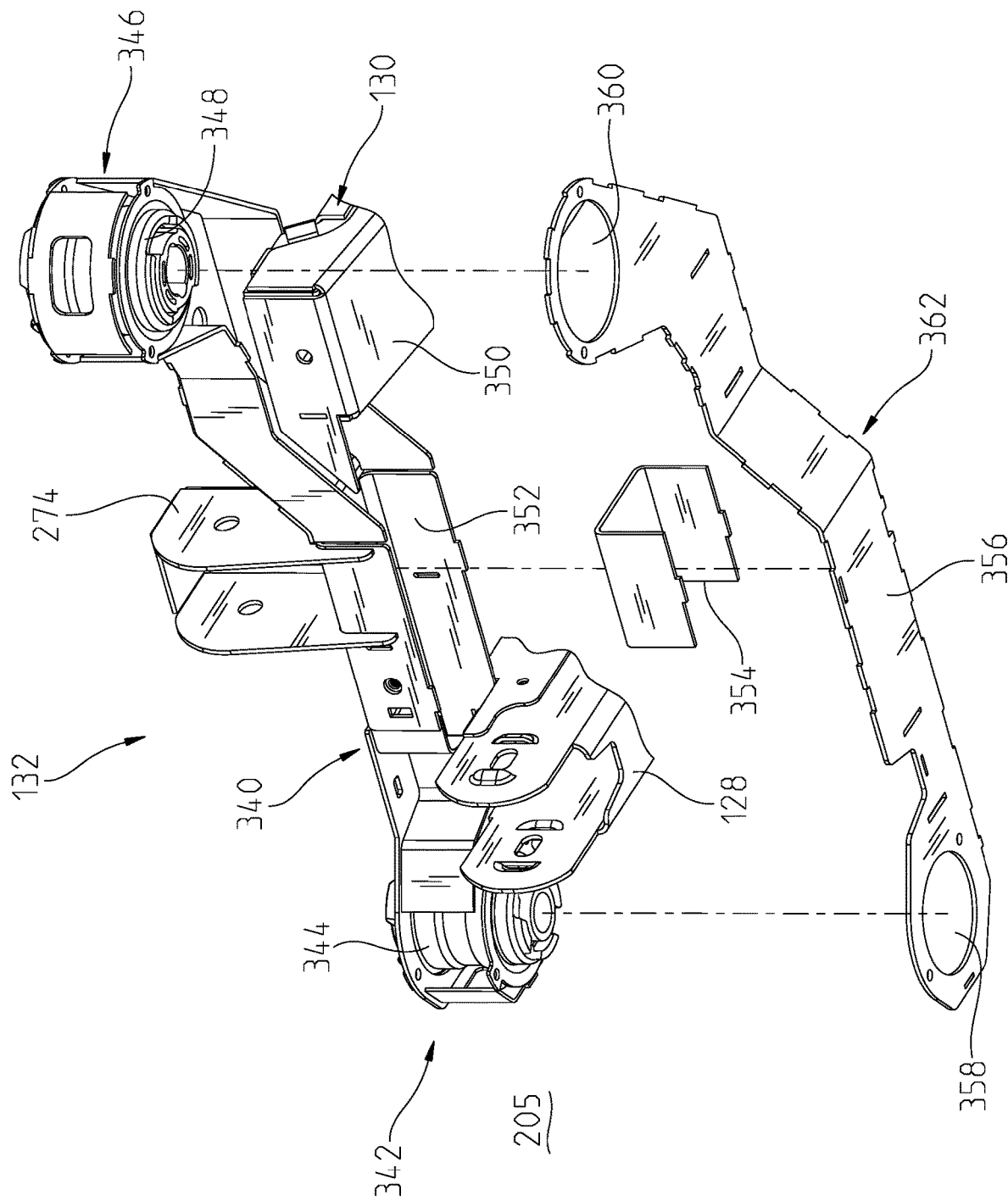
FIG. 7 illustrates a bottom perspective exploded view of a left side of the subassembly of FIGS. 5 and 6.

FIG. 7 illustrates an exploded bottom perspective view of a portion of the left side of the subassembly of FIGS. 5 and 6, including the left side bushing arm 132. In this view, the vehicle front 205 is shown on the left side of the illustration. The left side bushing arm 132 includes a main portion 340 which extends along the side of the floor 112 and includes a front end part 342 configured to receive a bushing 344 of the vehicle 100. The front end part 342 is located forward of the front crossmember 128. A rear end part 346 is located reward of the rear crossmember 130. The rear end part 346 is configured to receive a bushing 348 which is coupled to the frame.

Since the frame locations for the bushings 344 and 348 are offset elevationally as well as longitudinally, the rear end part 346 is angled both upwardly as well as outwardly from the main portion 340. The crossmember 130 is coupled to an offset extension 350 which is coupled to the end part 346 and which provides an offset for the rear crossmember 130. The offset of the extension 350 establishes the location of the rear crossmember 130 at a location which is substantially the same as the position of the front crossmember 128.

The camber link mount 274 extends from the main portion 340 and is coupled to the camber link as previously described. In this embodiment, the main portion 340 includes a number of parts formed to include channel pieces having three sides. For instance, the main portion 340 includes a first channel piece 352 and a second channel piece 354, which is located within the first channel piece 352. The channel piece 354 provides rigidity for the main portion 340 stabilizes the camber link mount 274. By removing the crossmember 222, the load from the camber links is translated to the bushing arms. Consequently, the channel piece 354 keeps the bushing arm subassembly from being overstressed in the localized area around the camber link mounts 274. The rear end part 346 is also formed of a three sided part having a channel which is configured to receive the extension 350.

The left side bushing arm 132 further includes a cover plate 356, located beneath the front end 342, the main portion 340, and the rear end 346. The cover plate 356 includes a first aperture 358 and a second aperture located at opposite ends. The cover plate 356 includes a jog portion 362 which follows the angle of the rear end part 346. The cover plate 346 closes off the channels of the parts to which it is coupled, and substantially prevents dirt and debris from entering the channels. Additional rigidity is also provided by the cover plate 356.

The right side bushing arm 134 is formed of similarly constructed parts, except that the parts are configured to extend in an opposite direction to couple to connection locations on the frame. In both the left side bushing arm 132 and 134, the arms are formed of multiple pieces made of a high strength material, such as steel. Other materials are, however, within the scope of the disclosure. Other embodiments include fewer or greater individual parts which are formed of bent sheet materials or extruded materials.

Figure 8:
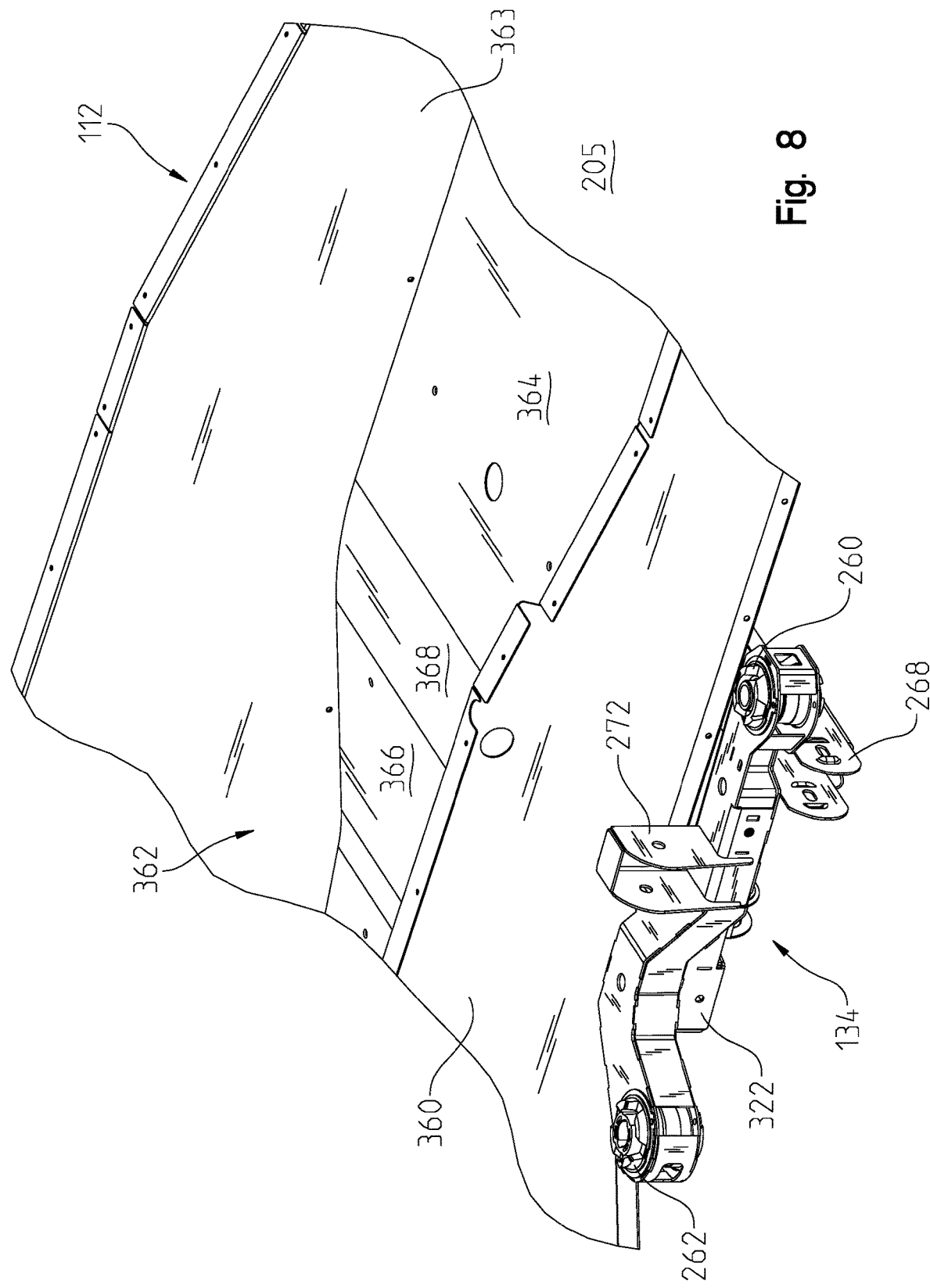
FIG. 8 illustrates a portion of a floor and a right side bushing arm located adjacently to the floor.

FIG. 8 illustrates a portion of the floor 112 and the right side bushing arm 134 located adjacent to the floor 112. The camber link mount 272 extends above the bushing arm 134 and is disposed adjacently to a right side wall 360. The floor 112 includes an interior portion 362 which includes a relatively horizontal portion 364 and a ramp portion 366, which is inclined with respect to the horizontal portion 364, each of which extends from the side wall 360 to another side wall 363. The ramped portion 366 inclines downwardly from the horizontal portion 364 to the rear of the vehicle 100. Located between the horizontal portion 364 and the ramped portion 366 is a transition portion 368, which includes a curved portion to transition between the two portions 364 and 366. The curved portion provides a gradual transition between the horizontal portion 364 and the ramped portion 366 for a wheelchair occupant. The gradual transition reduces the effort needed by the wheelchair occupant to move between portions, should the occupant be using a manually powered wheelchair, when compared to an abrupt transition if there were no gradual transition. The rear crossmember 130 beneath the floor 112 is positioned at a location at or between the horizontal portion 364 and the transition portion 368.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A suspension assembly defining a central longitudinal axis and a horizontal plane for a passenger vehicle, the suspension assembly comprising:

left and right bushing arms configured to extend generally along the central longitudinal axis and along the horizontal plane wherein each of the left and right bushing arms includes a main portion extending along the horizontal plane and operatively connected to a rear end part, wherein the rear end part includes the angled portion that is angled upwardly from the main portion; and front and rear crossmembers rigidly connected to the left and right bushing arms, wherein each of the left and right bushing arms includes an angled portion configured to be inclined with respect to the horizontal plane and configured to be inclined with respect to the central longitudinal axis, wherein the rear crossmember includes a first end connected to the rear end part of the left bushing arm and a second end connected to the rear end part of the right bushing arm and each of the first end and the second end extend downwardly from the respective rear end parts to a main portion of the rear crossmember.

2. The suspension assembly of claim 1 wherein the angled portion of the rear end part is angled away from the central longitudinal axis.

3. The suspension assembly of claim 2 wherein the main portion includes a front end part configured to receive a bushing of the vehicle.

4. The suspension assembly of claim 3 further comprising a left camber mount link coupled to the main portion of the left bushing arm and a right camber mount link coupled to the main portion of the right bushing arm, wherein the left camber mount link extends above the main portion of the left bushing arm and the right camber mount link extends above the main portion of the right bushing arm.

5. The suspension assembly of claim 3 wherein the rear end part is located rearward of the rear crossmember.

6. The suspension assembly of claim 3 wherein the front end part is located forward of the front crossmember.

7. The suspension assembly of claim 3 wherein the rear crossmember includes a left spring link bracket and a right spring link bracket, wherein each of the left spring link bracket and the right spring link bracket are configured to receive a spring link of the vehicle.

8. The suspension assembly of claim 3 wherein a first distance between the front end part of the left bushing arm and the front end part of the right bushing arm is less than a second distance between a left side damper assembly and a right side damper assembly of the vehicle.

9. The suspension assembly of claim 3 wherein each of the left bushing arm and the right bushing arm include a jog plate extending from the front end part to the rear end part, wherein the jog plate includes a jog portion which follows the angled portion of the rear end part.

10. A modified original equipment manufactured vehicle defining a central longitudinal axis and a horizontal plane comprising:
an original equipment manufactured vehicle frame, the vehicle frame including at least two bushing locations;
a floor having a first portion generally aligned with the horizontal plane and an inclined portion inclined with respect to the horizontal plane;
a suspension assembly subtending the floor and including a first angled portion inclined with respect to the horizontal plane and with respect to the longitudinal axis and a second angled portion inclined with respect to the horizontal plane and with respect to the longitudinal axis, wherein each of the angled portions includes a bushing operatively connected to the at least two bushing locations, wherein the suspension subassembly includes a left bushing arm including the first angled portion, a right bushing arm including the second angled portion, front and rear crossmembers rigidly connected to the left and right bushing arms, and wherein each of the left bushing arm and the right bushing arms extend generally along the central longitudinal axis, and further wherein each of the left and right bushing arms includes a main portion extending along the horizontal plane and operatively connected to a rear end part, wherein the rear end part of the left bushing arm includes the first angled portion which is angled upwardly from the main portion, and the rear end part of the right bushing arm includes the second angled portion which is angled upwardly from the main portion.

11. The vehicle of claim 10, wherein the main portion of each of the left and right bushing arms includes a front end part configured to include a bushing operatively connected to the at least two bushing locations.

12. The vehicle of claim 11 further comprising a left camber mount link coupled to the main portion of the left bushing arm and a right camber mount link coupled to the main portion of the right bushing arm, wherein the left camber mount link extends above the main portion of the left bushing arm and the right camber mount link extends above the main portion of the right bushing arm.

13. The vehicle of claim 12 further comprising a front and rear crossmembers rigidly connected to the left and right bushing arms.

14. The vehicle of claim 13 wherein the rear end part of each of the left bushing arm and the right bushing arm is located rearward of the rear crossmember.

15. The vehicle of claim 13 wherein the front end part of each of the left bushing arm and the right bushing arm is located forward of the front crossmember.

16. A method of modifying an original equipment manufactured vehicle defining a central longitudinal axis and a horizontal plane having a floor, a suspension assembly, and at least two bushing locations, the method comprising:
removing the floor of the vehicle;
removing the suspension assembly of the vehicle; and
installing a replacement suspension assembly in the vehicle to the at least two bushing locations, wherein the replacement suspension assembly includes a first angled portion inclined with respect to the horizontal plane and with respect to the longitudinal axis and a second angled portion inclined with respect to the horizontal plane and with respect to the longitudinal axis, wherein each of the angled portions includes a bushing operatively connected to the at least two bushing locations.

17. The method of claim 16 further comprising:
installing a replacement floor above the replacement suspension assembly, wherein the replacement floor includes a relatively horizontal portion and a ramp portion inclined downwardly with respect to the horizontal portion inclines downwardly.

18. The method of claim 17 wherein the installing step includes wherein the replacement floor includes a curved portion configured to transition between the horizontal portion and the ramp portion.

* * * * *